United States Patent
Mullen

[11] Patent Number: 6,036,260
[45] Date of Patent: Mar. 14, 2000

[54] COVER FOR A PERSON IN A SEAT

[75] Inventor: Sharon VL Mullen, 30 Exeter Rd., Hampton, N.H. 03842

[73] Assignee: Sharon VL Mullen, Hampton, N.H.

[21] Appl. No.: 09/186,434

[22] Filed: Nov. 5, 1998

Related U.S. Application Data

[60] Provisional application No. 60/065,526, Nov. 13, 1997.

[51] Int. Cl.[7] .................................................. A47D 15/00
[52] U.S. Cl. .................... 297/184.13; 297/465; 297/485; 2/69.5
[58] Field of Search ........................... 297/184.13, 217.1, 297/250.1, 219.12, 464, 465, 485; 5/494, 923; 2/69, 69.5

[56] References Cited

U.S. PATENT DOCUMENTS

| | | | |
|---|---|---|---|
| 1,616,349 | 2/1927 | Cagle | 297/465 |
| 2,789,292 | 4/1957 | Budinquest | 5/494 X |
| 2,980,169 | 4/1961 | Campbell | 2/69 X |
| 3,311,925 | 4/1967 | Lilla et al. | 2/111 |
| 3,566,864 | 3/1971 | Garrow | 128/134 |
| 3,727,238 | 4/1973 | Wolfson | 2/69 |
| 3,962,738 | 6/1976 | Menditto | 5/494 |
| 4,330,152 | 5/1982 | Legan et al. | 297/465 |
| 4,478,453 | 10/1984 | Schutz | 297/219.12 |
| 4,597,121 | 7/1986 | Bouma | 5/494 |
| 4,653,131 | 3/1987 | Diehl | 5/494 |
| 4,761,032 | 8/1988 | Sanchez et al. | 297/229 |
| 4,807,937 | 2/1989 | Harrigan | 297/465 |
| 4,846,528 | 7/1989 | Beier | 297/465 |
| 4,946,221 | 8/1990 | Livingston | 297/184.13 |
| 4,993,090 | 2/1991 | Ranalli | 5/482 |
| 5,026,115 | 6/1991 | Barnes | 297/219.12 |
| 5,058,226 | 10/1991 | Crosby | 5/494 |
| 5,125,712 | 6/1992 | Stamoutsos | 296/77.1 |
| 5,150,945 | 9/1992 | Aupperlee et al. | 297/184.13 |
| 5,193,235 | 3/1993 | Kircher | 5/494 X |
| 5,437,061 | 8/1995 | Kenner | 2/69 |
| 5,562,326 | 10/1996 | Stroud | 297/485 X |
| 5,586,351 | 12/1996 | Ive | 5/655 |
| 5,806,096 | 9/1998 | Pennington | 2/80 |

*Primary Examiner*—Peter R. Brown
*Attorney, Agent, or Firm*—Hayes, Soloway, Hennessey, Grossman & Hage, P.C.

[57] ABSTRACT

A cover for a person in a seat, e.g. a child in a car seat, booster seat, stroller, or other seating arrangements, including a recessed notch to allow for proper covering of a child's shoulders, an extended tab to provide covering for the child's legs and feet, and two side wings allowing the cover to be secured to the seating arrangement. The cover is provided with fasteners to removably secure the cover to corresponding fasteners on the seating arrangement.

9 Claims, 2 Drawing Sheets

COVER FOR A PERSON IN A SEAT

CROSS REFERENCE TO RELATED APPLICATIONS

The present application claims priority to U.S. Provisional Application No. 60/065,526 filed Nov. 13, 1997, the teachings of which are incorporated herein by reference.

FIELD OF THE INVENTION

The present invention relates in general to a blanket-type covering for a person, and in particular, to a covering to be used in conjunction with an infant in a car or booster seat, or a stroller, or any other type of seating arrangement.

BACKGROUND OF THE INVENTION

Currently, various designs of blankets or blanket type covers for infants and children exist which are to be used in infant or child seats or strollers. There are additionally blanket-type covers for portable infant seats designed for children up to 20 pounds, which provide removable attachment and cover the entirety of the infant with the exception of the face.

For example, U.S. Pat. No. 5,437,061 describes a blanket type covering for use with a stroller, a car seat, bicycle seat or the like. It consists of a protective poncho-like cover that encompasses the entirety of the child as well as the stroller itself. This cover makes it very difficult, if not impossible, to adjust the covering for the child's comfort. It is also difficult to attach to the stroller because it must encompass the entire stroller with the child seated. Furthermore, it doesn't allow for the older child who has grown significantly since purchase to continue using the covering.

U.S. Pat. No. 4,993,090 describes a covering for use with a car seat. It consists of a blanket with apertures cut out for the seat belts. This type of covering completely surrounds the child and folds at the front. Thus, it is either completely covering the child, or leaves the child completely uncovered. Again, the desired versatility of covering various parts of the child is non-existent. This type of blanket is designed for use solely in a car seat, and as designed does not allow for coverage of the child's legs as they extend from the seat.

The designs described above provide for at least partial coverage of the younger infant (less than 20 pounds). These designs do not however, provide for the needs of the older infant or child, who has outgrown the portable infant seat or for easily removable attachment combined with flexibility for the older, more active child. They also do not provide for attachment to older adults who may be confined to wheelchairs.

Traditional blankets or blanket-type covers which do not removably attach to the infant or child seat or stroller are subject to becoming dislodged, with the resultant effect that they become entangled in the wheels of the stroller or fall to the ground or floor of a motor vehicle, becoming wet or soiled. Additionally, blankets of the conventional shape leave considerable amounts of fabric dangling off the lower edges of strollers, tending to drag on the ground and pull the entire blanket with it. Traditional blankets also require tucking in around the shoulders that come loose as the child moves, and leave excess blanket at the child's neck.

Accordingly, there is a need in the art for a blanket-type covering which can be used to cover and provide warmth for people of various sizes in infant booster or car seats, strollers, wheelchairs, or the like that requires versatile coverage for warmth and comfort.

OBJECTS OF THE INVENTION

It is, therefore, an object of the present invention to provide a novel blanket-type covering which can be used to cover and provide warmth for people of various sizes in infant, child, booster car seats, or the like while seated in a stroller or any other similar seating arrangement that requires versatile coverage for warmth and comfort.

It is another object of the invention to provide a covering with a recessed notch at the top of the cover to allow for proper covering of the shoulders while not restricting head movement, an extended tab at the bottom to provide coverage of the feet and legs, and a pair of wings on either side to facilitate attachment to any type of seating arrangement.

A further object of the invention is to provide a covering which is equipped with a plurality of fasteners, which are separately applied to the cover for removably securing the cover to the seat in multiple variations.

These and other objects of the present invention will become apparent from a review of the following detailed description of the invention, taken together with the drawings, in which reference numbers are included for ease of understanding of each of the different views.

SUMMARY OF THE INVENTION

The present invention is organized about the concept of providing a blanket-type cover for a person in a seat which provides for removable attachment to the seat and variable coverage of the person. The cover may be constructed of any type of fabric, and is shaped to include a recessed notch at the top of the cover, an extended tab at the bottom, and a pair of side wings with fasteners thereon for removable connection of the cover to a seating arrangement.

In particular, a cover according to the invention includes: a body having a top and a bottom, a recessed notch located at the top for positioning adjacent the person's head, an extended tab located at the bottom for covering at least a portion of the person's legs, and a pair of side wings defined by the notch and the tab. The side wings allow the cover to be removably secured to the seat either by tucking the side wings between the seat and the person, or by means of fasteners secured to the side wings which mate with corresponding connection points on the seat. The fasteners allow the cover to be attached at different points on the seating arrangement to facilitate variable coverage in different conditions. The fasteners used in conjunction with the preferred embodiment are placed in primarily three positions on each of the sides which correspond to mating connection points on the seat.

In one embodiment, the side wings include a pair of shoulder tabs on the tops thereof adjacent the notch. The shoulder tabs are adapted to at least partially cover the person's shoulder's when the person's head is at least partially disposed within the notch. Preferably, the shoulder tabs may be defined by the recessed notch which extends symmetrically from a longitudinal center axis of the body toward the pair of sides and then symmetrically up toward the top. The tab is preferably of the same dimensions of the notch, and extends at the bottom of the body symmetrically toward the sides from the longitudinal axis and symmetrically up from the bottom toward the pair of sides.

The body is formed from at least one stretch of fabric selected from the group consisting of; natural fabric, synthetic fabric and blend fabric. Optionally, the front of the body may be from a first stretch of fabric and the back of the body formed by second stretch of fabric which is joined to the first stretch of fabric. The fabrics utilized to make up the front and back portions may include, but are not limited to, natural fabrics, synthetic fabrics and blend fabrics.

In addition to the structure of the present invention, there is also provided a method of covering a person. The method includes the steps of providing a cover according to the invention, placing the cover over the person in the seat with the tab at least partially covering the person's legs, aligning the fasteners on the side wings with corresponding connection points on the seat, and coupling the fasteners to the connection points.

BRIEF DESCRIPTION OF THE DRAWING

For a better understanding of the present invention, together with other objects, features, and advantages, reference should be made to the following description of the preferred embodiment which should read in conjunction with the following figures wherein the numerals represent like parts.

DETAILED DESCRIPTION OF THE PREFERRED EMBODIMENT

Figure 1:
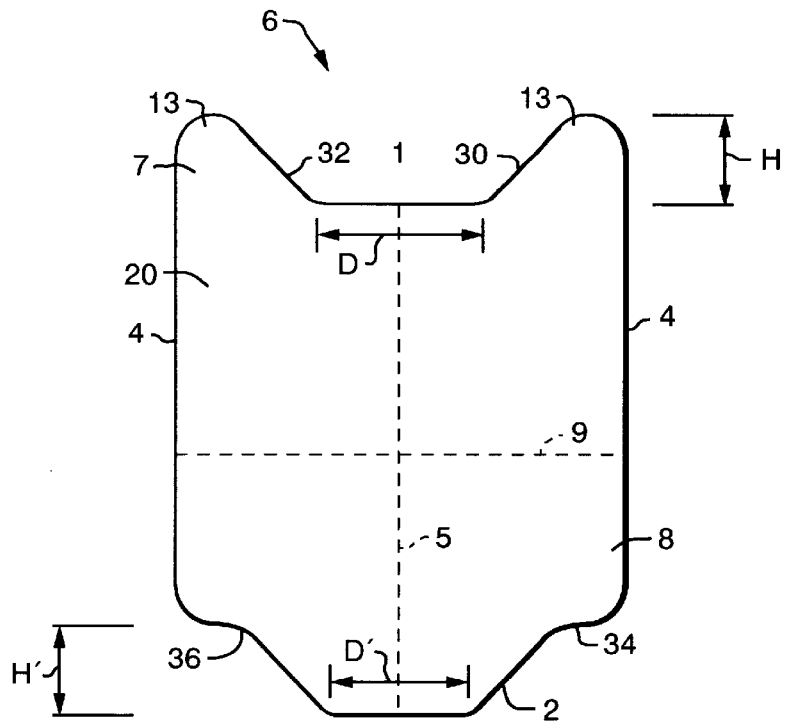
FIG. 1: is a front view of a cover according to the invention.
Figure 2:
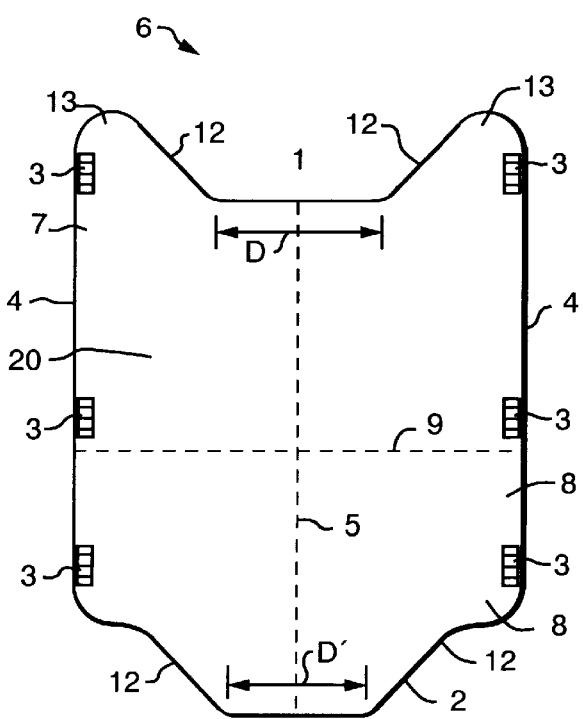
FIG. 2: is a back view of the cover shown in FIG. 1.
Figure 3:
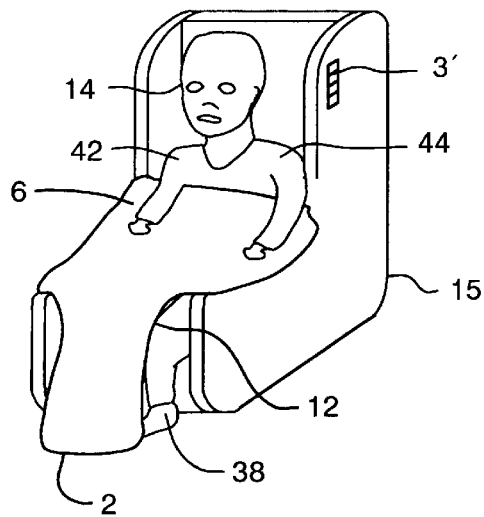
FIG. 3: is a front view of a cover according to the invention when folded down and attached to a car seat.
Figure 4:
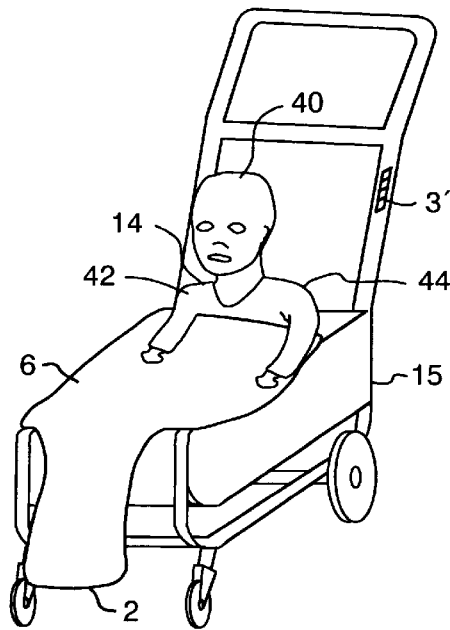
FIG. 4: is a front view of the cover in FIG. 3 when folded down and attached to a stroller.
Figure 5:
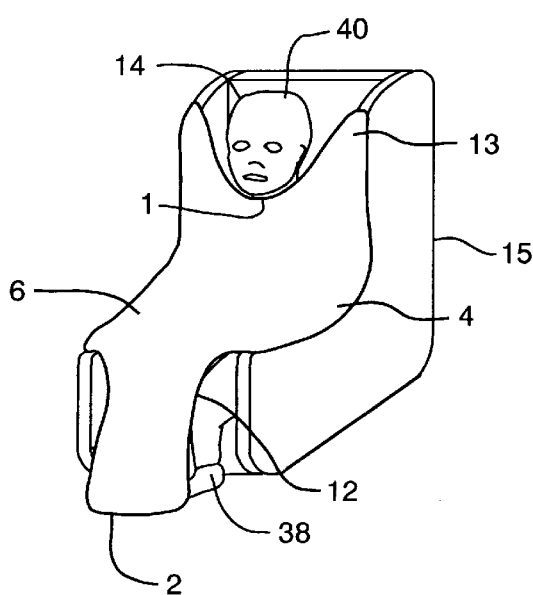
FIG. 5: is a front view of a cover according to the invention when all points are attached to a car seat.

The present invention will now be described in detail by reference to the drawings. FIGS. 1 and 2 illustrate the preferred embodiment of the invention. FIGS. 3, 4, and 5 show the preferred embodiment used in conjunction with particular seating arrangements in various modes of coverage.

In FIGS. 1 and 2, there is shown a front view of a cover 6 which includes a body 20 and fasteners 3. The body 20 is comprised of a top portion 7 and a bottom portion 8. In the top portion 7 of the body there is formed a recessed notch 1. The notch 1 is preferably formed symmetrically in the body with reference to a longitudinal center 5. The notch extends from the longitudinal center toward the sides of the body, and runs parallel to a latitudinal center 9 for a distance D, where the notch edges 30, 32 then slope substantially upward at an angle of about 55 degrees to form a notch height H.

At the bottom portion of the body 20, there is formed an extended tab 2 which is also preferably formed symmetrically in the body with reference to the longitudinal center. The tab extends from the longitudinal center, and runs parallel to the latitudinal center 9 for a distance D' where the tab edges 34, 36 then slope substantially upward at an angle of about 55 degrees to form a tab height H'.

Although the distances D and D' and the heights H and H' may be adjusted to accommodate the particular person for which the cover is intended, in the preferred embodiment, the distance D is equal to the distance D'. In one embodiment, where the body has an overall height of about 39" and an overall width of about 29", the distances D, D' are about 10", and the heights H, H' are about 6". Again, however, it is to be understood that the notch and tab dimensions may be adjusted to accommodate a particular user.

Referring still to FIGS. 1 and 2, the notch and the tab define a pair of wings 4 in the body which extend longitudinally, parallel to the longitudinal center 5 of the body 20. Advantageously, when the notch 1 is positioned adjacent a person's head and the tab 2 is positioned over a person's legs, as will be described in detail hereinafter, the tops of the side wings 4 function as a pair of shoulder tabs 13 which extend over a person's shoulders. In addition, the back side of the side wings, as shown particularly in FIG. 2, preferably have fasteners 3 disposed thereon. Although the cover may be used without fasteners while maintaining many of the advantages described herein, in the preferred embodiment the fasteners 3 are, in essence, any device for attaching the cover to any seat or seating arrangement.

Many types of fasteners will be known to those skilled in the art, they can be of any manufacture, including but not limited to snap-type, tie-type hook, and loop type or button type. In the preferred embodiment of the present invention, the fasteners 3 are one-half, e.g. the loop portion, of a Velcro®-type hook and loop fastener, and are positioned along the side wings 4 on either side, in the top portion 7, the bottom portion 8, and substantially in between the top portion 7 and bottom portions 8. When the fasteners 3 are a first half of a mating connection system including two halves(e.g., a hook and loop type system), the other halves of the system, e.g., the other half of the Velcro®-type fasteners, form connection points 3' (FIGS. 3,4) for the fasteners 3 which are connected at corresponding locations on the seating arrangement of choice.

Many materials may be used for construction of the body 20. A suitable material for the body 20 may be a polyester fleece, cotton flannel, and any other natural, synthetic, blend fabric. Preferably, edges of the fabric are hemmed or finished by any suitable method. Velcro®-type loop and hooks fasteners are sewn onto the back of the covering along the side wings as discussed above. The edges of the fabric may be rolled, serged, looped, trimmed with a contrasting satin or stretch fabric, or finished in any other suitable manner, or left unfinished.

Also, as discussed above, it has been found that cost-efficient construction is achieved by making the dimensions of the recessed notch 1 substantially identical to those of the extended tab 2. This conserves material and reduces construction time since the notch cut at the bottom of cover 6 can form the tab cut in the next cover to be manufactured. This dimensional symmetry also allows for construction of the cover by die cutting a web of material.

It is also possible that the body 20, can be manufactured using two or more different stretches of fabric, creating a front and a back for the cover 6. For example, the cover 6, can be made of an insulating material on the back while allowing for design choice of a different material on the front. Also, an insulating or other material may be disposed between front and back stretches of fabric to form the cover. Many variations of fabrics can be combined for variable applications.

In one mode of use, as illustrated in FIGS. 3 and 4, the cover may be attached to the seat to provide a secure yet comfortable coverage of the lower extremities and torso while allowing a person with freedom of movement of the upper extremities and torso. As shown, the cover is positioned over a person, e.g. an infant 14, with the tab 2 disposed over the infant's legs 38. The fasteners 3 (FIG. 2) are then secured to corresponding connection points 3' on the seat to prevent the cover from separating from the seat 15 and falling off of the infant. The infant's upper torso can be left uncovered and free to move by allowing the fasteners 3 to remain unsecured to the connection points 3' at the top part of the seat 15, and then folding the cover 6 onto itself to an amount at or below the level of the recessed notch, creating a lap covering.

Advantageously, however, as shown in FIG. 5 the present invention also functions to provide maximum coverage of a person in a seating device using all of the fasteners to secure the covering to the seating device. In this mode of use, the cover is positioned over the infant with the infant's head 40 disposed at least partially within the notch 1, and with the tab 2 disposed over the infant's legs 38. The shoulder tabs are extended over the infant's shoulders 42, 44 and secured to the seating arrangement 15 by mating of the fasteners 3 with the connection points 3'. All of the fasteners 3 are secured to the corresponding connection points 3' on the seat 15 to prevent the cover from separating from the seat 15 and falling off of the infant. Thus, the infant's entire upper and lower body are covered while allowing freedom of movement for the head 40.

Thus, the present invention functions to allow a care-giver to secure the cover 6 to the seating arrangement 15 to prevent the cover 6 from dislodging and also to prevent the cover 6 from falling off the infant 14 or dragging on the ground, becoming wet or soiled. The present invention also provides versatility of attachment, thereby allowing the care-giver to selectively cover only the lower body of an infant or both the lower and upper body. Also, the invention allows the care-giver to maintain attachment of one wing 14 to the seating arrangement allowing for removal of the infant 14, while re-attachment of the cover 6 may be performed using only a single hand. When the seating arrangement 15 includes the use of wheels, as shown in FIG. 4, the cover 6 remains secured to the seating arrangement, thereby preventing entanglement of the cover in the wheels, and eliminating the potential for damage to both the infant 14, the cover 6 and the seating arrangement 15.

The present invention is not limited to use with infants, and may be utilized by larger, older persons, including adults, in conjunction with wheelchairs or other seating arrangements. In order to use with larger people, the dimensions of the cover 6 would required adjustment.

The present invention is thus useful in a method of covering a person in a seating arrangement. The first step in the method is placing a cover 6 as described above on a person 14 seated in the seating arrangement 15 and aligning the fasteners 3, which are on the body 20, to the connection points 3' which are on the seating arrangement 15. The fasteners 3, which have been affixed to the cover 6 are then coupled to the connection points 3', which have been affixed to the seating arrangement 15.

There is thus provided a cover which is particularly useful for covering a child in a car seat, booster seat, stroller, and other seating arrangements. In the preferred embodiment, the body 20 includes a recessed notch in which a child's head may be partially disposed and an extended tab to provide covering for the child's legs and feet. Two side wings are defined by the tab and the notch which allow the attachable covering to be secured to the seating arrangement by fasteners which mate which corresponding connection points, such as hook-and-loop fasteners. The tops of the side wings define a pair of shoulder tabs which may be extended over a child's shoulders.

The embodiments which have been described herein, however, are but some of the several which utilize this method and are set forth herein by way of illustration but not of limitation. It is obvious that many other embodiments which will be readily apparent to those skilled in the art may be made without materially departing from the spirit and scope of the invention.

What is claimed is:

1. A cover for a person in a seat comprising:
    a body comprised of a single sheet including at least one layer of material and having a top and a bottom;
    a recessed notch located at said top for positioning adjacent the person's head;
    an integral extended tab located at said bottom for covering a substantial portion of said person's legs; and
    a pair of side wings extending laterally relative to said notch and said tab, each of said side wings having a plurality of fasteners thereon for allowing said cover to be removably secured to said seat with said person disposed between said cover and said seat.

2. A cover according to claim 1, wherein said pair of side wings include a pair of shoulder tabs on the tops thereof adjacent said notch, said shoulder tabs being adapted to at least partially cover said person's shoulder's when said person's head is at least partially disposed within said notch.

3. A cover according to claim 1, wherein said body has a pair of sides and a longitudinal center axis, and wherein said recessed notch extends symmetrically from said longitudinal center axis toward said pair of sides and then symmetrically up toward said top, thereby creating a pair of shoulder tabs at the tops of said side wings, said shoulder tabs being adapted to at least partially cover said person's shoulder's when said person's head is at least partially disposed within said notch.

4. A cover according to claim 1, wherein said body has a pair of sides and a longitudinal center axis, and wherein said tab extends at said bottom symmetrically toward said sides from said longitudinal axis and symmetrically up from said bottom toward said pair of sides.

5. A cover according to claim 1 wherein three of said fasteners are disposed on each of said side wings.

6. A cover according to claim 1, wherein said body comprises a stretch of fabric selected from the group consisting of; natural fabric, synthetic fabric and blend fabric.

7. A cover according to claim 1, wherein the body includes a front and a back, and wherein said front comprises a first stretch of fabric and said back which comprises a second stretch of fabric, said first and second stretches of fabric being selected from the group consisting of; natural fabric, synthetic fabric and blend fabric, said front is attached to said back.

8. A cover for a person in a seat comprising:
    a body comprised of a single sheet including at least one layer of material and having a top, a bottom, a pair of sides and a longitudinal center axis;
    a recessed notch located at said top for positioning adjacent said person's head, said notch extending symmetrically from said longitudinal center axis toward said pair of sides and then symmetrically up toward said top,
    an integral extended tab located at said bottom for substantially covering said person's legs, said tab extending at said bottom symmetrically toward said sides from said longitudinal axis and then symmetrically up from said bottom toward said pair of sides;
    a pair of side wings defined by said notch and said tab and extending laterally relative to said notch and said tab, said side wings including a pair of shoulder tabs adjacent said notch; and
    a plurality of fasteners on each of said side wings, said fasteners being removably securable to corresponding connection points on said seat for thereby removably securing said cover to said seat with said person's head disposed at least partially within said notch, sad person's shoulders at least partially covered by said shoulder tabs, and said person's legs at least partially covered by said tab.

9. A method of covering a person in a seat comprising the steps of:

providing a cover, said cover comprising a body comprised of a single sheet including at least one layer of material and having a top and a bottom, a recessed notch located at said top for positioning adjacent the person's head, an integral extended tab located at said bottom for covering a substantial portion of said person's legs; and a pair of side wings extending laterally relative to said notch and said tab, each of said side wings having a plurality of fasteners disposed thereon for allowing said cover to be removably secured to said seat with said person disposed between said cover and said seat;

placing said cover over said person in said seat with said tab at least partially covering said person's legs;

aligning said fasteners on said side wings with corresponding connection points on said seat; and coupling said fasteners to said connection points.

* * * * *

UNITED STATES PATENT AND TRADEMARK OFFICE
CERTIFICATE OF CORRECTION

PATENT NO. : 6,036,260
DATED : March 14, 2000
INVENTOR(S) : Mullen

It is certified that error appears in the above-identified patent and that said Letters Patent is hereby corrected as shown below:

Col. 7, line 3, "sad" should be - -said- -.

Signed and Sealed this

Twentieth Day of March, 2001

Attest:

NICHOLAS P. GODICI

Attesting Officer      *Acting Director of the United States Patent and Trademark Office*